(12) United States Patent
Karbowski et al.

(10) Patent No.: US 11,028,981 B2
(45) Date of Patent: Jun. 8, 2021

(54) AUTOMOTIVE LIGHTING DEVICE AND LIGHTING SYSTEM

(71) Applicant: Lumileds LLC, San Jose, CA (US)

(72) Inventors: Udo Karbowski, Aachen (DE); Christian Kleijnen, Aachen (DE); Josef Schug, Aachen (DE)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/787,918

(22) Filed: Feb. 11, 2020

(65) Prior Publication Data
US 2020/0256527 A1 Aug. 13, 2020

(30) Foreign Application Priority Data

Feb. 12, 2019 (EP) ..................... 19156725

(51) Int. Cl.
F21S 4/24 (2016.01)
F21V 23/06 (2006.01)
B60Q 3/56 (2017.01)
F21Y 103/10 (2016.01)
F21Y 115/10 (2016.01)

(52) U.S. Cl.
CPC ............... F21S 4/24 (2016.01); B60Q 3/56 (2017.02); F21V 23/06 (2013.01); F21Y 2103/10 (2016.08); F21Y 2115/10 (2016.08)

(58) Field of Classification Search
CPC ... F21S 4/24; F21V 23/06; B60Q 3/56; F21Y 2103/10; F21Y 2115/10
See application file for complete search history.

(56) References Cited

U.S. PATENT DOCUMENTS

| | | | |
|---|---|---|---|
| 9,539,932 B2* | 1/2017 | Fay | H05B 45/10 |
| 10,724,712 B2* | 7/2020 | Li | F21S 4/24 |
| 2002/0145392 A1 | 10/2002 | Hair et al. | |
| 2004/0037079 A1 | 2/2004 | Luk | |
| 2008/0094828 A1* | 4/2008 | Shao | F21S 4/20 362/219 |
| 2010/0008090 A1* | 1/2010 | Li | F21S 4/24 362/249.03 |
| 2011/0255287 A1* | 10/2011 | Li | F21S 2/005 362/249.02 |
| 2012/0105498 A1 | 5/2012 | Kim et al. | |
| 2012/0262076 A1 | 10/2012 | Briggs | |

(Continued)

OTHER PUBLICATIONS

European Application Serial No. 19156725.4, European Search Report dated Apr. 18, 2019, 8 pgs.

Primary Examiner — Tracie Y Green
(74) Attorney, Agent, or Firm — Schwegman Lundberg & Woessner, P.A.

(57) ABSTRACT

Lighting device, in particular for automotive applications, comprising a plurality of lighting elements, wherein each lighting element comprises at least one or more light emitting diodes (LEDs). The lighting device comprises a first connector for connecting the lighting device to a lighting driver. The lighting elements are arranged in a row in order to form a luminous band. The plurality of lighting elements is divided into more than one group, each group consisting of at least one or more lighting elements. The lighting elements of one group are electrically connected in series. The groups are electrically connected in parallel in order to control each group individually.

18 Claims, 6 Drawing Sheets

(56) References Cited

U.S. PATENT DOCUMENTS

2014/0362574 A1* 12/2014 Barrett ...................... F21S 4/28
                                                              362/249.03
2017/0215243 A1*  7/2017 Briggs .................... F21V 23/04
2018/0279432 A1*  9/2018 Briggs ...................... F21S 4/20

* cited by examiner

AUTOMOTIVE LIGHTING DEVICE AND LIGHTING SYSTEM

PRIORITY APPLICATION

This application claims the benefit of priority to EP Patent Application Serial No. 19156725.4, filed Feb. 12, 2019, which is incorporated herein by reference in its entirety.

FIELD

The present disclosure relates to a lighting device, in particular for automotive applications, and a lighting system comprising such a lighting device.

BACKGROUND

In the automotive field, it is currently a trend to implement lighting devices which can be controlled dynamically. This means that it is no longer sufficient that the lighting device can be switched on and off, but that in addition parts of the lighting device must be individually adjustable. For instance, in order to generate a dynamic lighting effect, individual parts may be switched on and off or may be dimmed. The availability of light emitting semiconductors (LEDs) has considerably enhanced the development of light emitting device that may be controlled dynamically.

LEDs may be controlled individually by addressing each LED by separate electronic wires. However, this results in numerous wires that need to be connected to a lighting driver in order to control each LED individually. This increases the necessary effort to fabricate and implement such a lighting device. Further, due to the numerous wires and the complex wire routing, the spatial constraints of the lighting device, in particular for automotive applications, are easily exceeded.

In order to avoid complex wire routing within the lighting device, it is possible to use flat ribbon cables instead. However, by using such flat ribbon cables, the flexibility of the lighting device is limited since flat ribbon cables are flexible in one direction only and not flexible and bendable in a plane in which the wires of the flat ribbon cable are arranged. Often, modern automotive lighting devices need to follow a complex 3D shape. Therefore, flat ribbon cables are not suitable for 3-dimensional applications.

Alternatively, it is well-known to combine each LED with a control chip as integrated circuit (IC) or microprocessor, wherein the control chips of the whole lighting device are communicating via a bus wire. In US 2012/262076 A1, a LED based lighting apparatus is disclosed. The light engine used in the lighting apparatus may use a multi-layer metal core printed circuit board and have a plurality of LED groups that are independently controllable by a control unit. However, implementing a control chip for each LED increases the costs of the lighting device. This is in particular true for the automotive field in which each IC or microprocessor must be tested and certified. This decreases the applicability of this solution and prolongs necessary development and design periods. Further, error detection is typically required in the automotive field and needs to be implemented by additional circuitry, which increases the complexity even further.

SUMMARY

Embodiments provide a lighting device and a lighting system that are flexible, dynamic controllable, less complex and suitable for error detection.

The lighting device in accordance with embodiments is in particular suitable for automotive applications, in particular in cars, and comprises a plurality of lighting elements, wherein each lighting element comprises at least one or more light emitting diodes (LEDs). The lighting elements are also known as or referred to as interposers. The lighting elements can be built substantially identically. The lighting elements may comprise a printed circuit board (PCB) carrying the LED. The LED can be mounted to the PCB either by direct attachment of the naked die or can be mounted as a surface mounted device (SMD), as a through hole technology (THT) component or any other type of component. A PCB may comprise one LED or more than one LED.

In accordance with embodiments, the lighting device comprises a first connector for connecting the lighting device to a lighting driver. The lighting driver can be built as integral part of the device or can be a separate entity. The first connector serves to control the lighting device and provides as well the power for the lighting device.

In accordance with embodiments, the lighting elements are arranged in a row in order to form a luminous band or lighting ribbon. The lighting device has a length which extends the width of the lighting device. For instance, the length of the lighting device may be more than 200 mm or more than 500 mm, while for instance, the width of the lighting element may be below 10 mm or below 6 mm. A long and very narrow lighting device may be achieved by arranging a large number of the lighting elements in a row. The lighting device can be placed for example below or between other lighting devices of a car, such as headlamps, auxiliary lamps and may for instance function as a position light, daytime running light, welcome light, turn signal, stop signal or contour lighting.

In accordance with embodiments, the plurality of lighting elements is divided into more than one group, wherein each group consists of one or more lighting elements. The lighting elements of one group are electrically connected in series, wherein the groups are electrically connected in parallel in order to control of each group individually. In order to achieve dynamical lighting, the lighting driver can address individual groups of lighting elements. Moreover, by dividing the lighting elements into groups, high currents through the plurality of lighting elements can be avoided. Further, by grouping the lighting elements, the complexity of the lighting device can be reduced while still providing a versatile lighting device due to the individually controllable groups of lighting elements.

In accordance with embodiments, each lighting element is directly electrical connected to a preceding and/or a following lighting element, except for the first and the last lighting element in the group that are connected to only respectively a following and a preceding lighting element. The individual lighting elements are connected by more than one electric wire. The direct connection between subsequent lighting elements may as well as well comprise one or more physical connections, which physical connections serves to connect the lighting elements in the structure of the lighting device. Such physical connection may again be a wire, more particular also one or more of the electric wires may provide the physical connection and thus have a double function. Consequently, the lighting elements are connected by more than one electrical wire and may as well, in addition, be physical connected. If the lighting element is built as circuit board than the wires may be physically connected to the PCB or through the PCB and are in electrical contact with the one or more LEDs of the specific lighting element.

In particular, the number of wires between two lighting elements is between 2 and 4 while the connector is configured to connect each of the wires to a lighting driver. The number of wires between each of the lighting elements can be the same along the complete lighting device. Increasing the number of wires between each of the lighting elements also increases the ability to control more groups of lighting elements. Simultaneously, the complexity of the lighting devices increases and also the necessary installation space. Thus, with a maximum of 4 wires between each of the lighting elements, a sufficient large number of groups can be controlled in order to provide dynamic lighting, for example for automotive applications.

In particular, the lighting device is flexible or bendable in two directions. The two directions can be perpendicular to each other and perpendicular to the longitudinal axis of the lighting device. The longitudinal axis of the lighting device is defined as the axis running along the row or lighting elements. A possible bending radius can be below 100 mm, below 50 mm or below 25 mm. Additionally or alternatively, the lighting device is twistable around the longitudinal axis. Twisting of the lighting device of 90° is possible within a length of 100 mm, within 75 mm or within 50 mm. With such flexibility the lighting device is suitable for a large number of applications and may be adapted to all kind of shapes.

The lighting device may comprise a light emitting area which has a width of less than 10 mm, less than 6 mm, or less than 4 mm. The light emitting area is the area through which light exits the device and the width is measured perpendicular to the longitudinal axis. Additionally or alternatively, the total width of the lighting device is less than 10 mm, less than 8 mm, or less than 6 mm. The width is measured perpendicular to the longitudinal axis. Thus, a small device is achieved suitable for all different kinds of application. Additionally, or alternatively, the height of the lighting device is less than 10 mm, less than 8 mm, or less than 6 mm.

The lighting elements and/or the wires may at least partially or completely be surrounded by a polymer. The polymer can include a silicon that provides sufficient flexibility and photothermal stability. The polymer can comprise a first transparent part arranged in front of the lighting elements in the direction of light emission. The transparent polymer forms the light emitting area through which light exits the lighting device. The transparent polymer may define the light emission characteristics of the lighting device such as opening angle of emission. Further, the polymer may comprise a second part of an opaque polymer. The opaque polymer is white to reflect most of the light towards the light emitting area and to enhance the efficiency of the lighting device. Optionally, an optical components (e.g. a microlens, an optical foil and/or a collimator) can be placed on top of the lighting device for beam shaping.

The lighting device may (not necessarily) consist of passive electrical components only. No processor or integrated circuits (ICs) or control chips are required.

The wires between two subsequent lighting elements may be separated from each other in order to be contact free and such that no electrical connection exists between the wires. Alternatively, or additionally, the wires are arranged in parallel between two subsequent lighting elements. The arrangement of the wires between each of the lighting elements can be substantially identical along the complete row. The wires can be arranged in a common plane. Bending of the lighting device perpendicular to this plane is possible in order to adapt the shape of the lighting device to the specific application. Even a complex 3D shape is possible.

In particular, the length of the wires between two subsequent lighting elements (and between each of the lighting elements) is greater than the distance between the two respective lighting elements. If the wires are arranged in a common plane, the greater length of the wires makes bending of the lighting device even more easily. Further, thermal expansion can be compensated by the length of the wires. The outer wires between two subsequent lighting elements and between each of the lighting elements longer than possible inner wire(s) or central wire(s).

In particular, the wires may have a meandering shape or S-shaped or curved shape or torturous form to be more or less flexible to compensate changes of the distance between the respective lighting elements during bending or thermal expansion. In particular, at least two groups are consisting of the same number of lighting elements. This makes it possible, for instance for the lighting driver, to compare current and/or voltage of the two groups and to detect an error if there is a deviation of current or power between the two identical groups. Each group can include the same number of lighting elements, and even the same number of LEDs. Thus, current and voltage of each group can be compared with each other group in order to obtain a reliable error detection.

The lighting device may comprise a second connector to be connected to a lighting driver, wherein the first connector is arranged at the beginning of the row and the second connector is, however not necessarily, arranged at the end of the row. The second connector connects at least one group to the lighting driver. The second connector increases the number of addressable groups without increasing the complexity of the wire routing. With two to four wires and/or two connectors a sufficient large number of groups can be addressed individually in order to provide dynamic lighting.

The lighting device may comprise at least one further connector arranged between the first connector and the second connector along the row for connecting at least one group of lighting elements to a lighting driver. The further connector can be arranged between two subsequent groups of lighting elements. By introducing a further connector, the number of addressable groups can even be increased without substantially increasing the complexity of wire routing in the lighting device. As a consequence, with two to four wires a larger number of groups can be addressed individually in order to provide dynamic lighting.

In particular, each of the connectors comprises one or more terminals for at least one of the groups. The terminals may comprise one or more of a ground terminal and/or one or more of an anode terminal. The number of terminals in the first connector and/or the number of terminals of the second connector is at least equal to the number of electric wires of the lighting device. The anode terminals may be used to control each of the groups individually. By the connectors and the wires, the groups of the lighting devices are connected to and individually controlled by the lighting driver. It is possible that a first connector comprises a ground terminal and one or more anode terminals while a second or third connector only comprises anode terminals. Alternatively, it is possible that a first connector comprises a ground terminal and one or more anode terminals while a second connector also comprises a ground terminal and one or more anode terminals. Also, it is possible that one connector comprises more than one ground terminal. Alternatively, the device can of course be used with multiple common anodes and switched ground terminals.

In particular, light is emitted by the lighting device in a direction perpendicular to the longitudinal axis of the lighting device. The longitudinal axis of the lighting device is defined as the axis running along the row or lighting elements. Light can be emitted only in one direction into one half space of the lighting device.

In particular, the lighting device emits light only in one direction along the complete luminous band, wherein an opening angle of the emission is equal to or below 180°. Thus, by the lighting device light is emitted only in one half space. The opening angle can be equal to or below 120° or equal to or below 90°.

The distance between each lighting element can be substantially identical in order to provide a homogeneous illumination. However, it is also possible to have different distances between at least two or more lighting elements to further tailor the illumination to a specific application.

In particular, the first connector may comprise one ground terminal and a first anode terminal as well as a second anode terminal, wherein three wires are uses to connect the lighting elements. The plurality of lighting elements is divided into two groups, wherein a first group is controlled by the first anode terminal and a second group is controlled by the second anode terminal while the first group and the second group are electrically connected with the common ground terminal. Thus, by three wires and one connector, two groups can be dynamically addressed by the lighting driver.

In particular, a first connector may comprise one ground terminal and a first anode terminal and a second anode terminal, wherein a second connector comprises one ground terminal and a third anode terminal and a fourth anode terminal. Each lighting element comprises one or more LEDs, wherein each group can have the same number of LEDs. Three wires are used to connect the lighting elements, wherein the plurality of lighting elements is divided into four groups, wherein a first group is controlled by the first anode terminal, a second group is controlled by the second anode terminal, a third group is controlled by the third anode terminal and a fourth group is controlled by the fourth anode terminal. First to fourth groups are electrically connected simultaneously to the common ground terminals of the first connector and the second connector. Thus, by two connectors and three wires, it is possible to have four groups which can be dynamically addressed by the lighting driver together with a thoroughgoing ground wire connecting the ground terminal of the first connector with the ground terminal of the second connector.

In particular, a first connector may comprise one ground terminal and a first anode terminal and a second anode terminal, wherein a second connector comprises a third anode terminal and a fourth anode terminal and a fifth anode terminal. Each lighting element comprises one or more LEDs, wherein each group has the same number of LEDs. Three wires are used to connect the lighting elements, wherein the plurality of lighting elements are divided into five groups, wherein a first group is controlled by the first anode terminal, a second group is controlled by the second anode terminal, a third group is controlled by the third anode terminal, a fourth group is controlled by the fourth anode terminal and a fifth group is controlled by the fifth anode terminal. First to fifth groups are electrically connected to the common ground terminals of the first connector. Thus, by two connectors and three wires, it is possible to have five groups which can be dynamically addressed by the lighting driver.

In particular, a first connector may comprise a first ground terminal and a second ground terminal and a first anode terminal and a second anode terminal, wherein a second connector comprises a third ground terminal and a fourth ground terminal and a third anode terminal and a fourth anode terminal. Each lighting element comprises one or more LEDs, wherein each group has the same number of LEDs. Four wires are used to connect the lighting elements, wherein the plurality of lighting elements are divided into seven groups, wherein a first group is connected between the first anode terminal and the first ground terminal, a second group is connected between the second anode terminal and the first ground terminal, a third group is connected between second anode terminal and the second ground terminal, a fourth group is connected between the third anode terminal and the second ground terminal, a fifth group is connected between the third anode terminal and the third ground terminal, a sixth group is connected between the fourth anode terminal and the third ground terminal and a seventh group is connected between the fourth anode terminal and the fourth ground terminal. Thus, by two connectors and four wires, it is possible to have seven groups which can be dynamically addressed by the lighting driver.

In particular, a first connector may comprise one ground terminal and a first anode terminal and a second anode terminal, wherein a second connector comprises a third anode terminal and a fourth anode terminal and also a ground terminal. Each lighting element comprises one or more LEDs, wherein each group has the same number of more LEDs. Three wires are used to connect the lighting elements, wherein the plurality of lighting elements are divided into ten groups. Between the fifth and sixth group a third connector is arranged, wherein the third connector comprises a fifth anode terminal and a sixth anode terminal and a seventh anode terminal and an eighth anode terminal and a ninth anode terminal and a tenth anode terminal. A first group is controlled by the first anode terminal, a second group is controlled by the second anode terminal, a third group is controlled by the third anode terminal, a fourth group is controlled by the fourth anode terminal, a fifth group is controlled by the fifth anode terminal, a sixth group is controlled by the sixth anode terminal, a seventh group is controlled by the seventh anode terminal, an eighth group is controlled by the eighth anode terminal, a ninth group is controlled by the ninth anode terminal and a tenth group is controlled by the tenth anode terminal. First to fifth groups are electrically connected to the common ground terminal of the first connector, while sixth to tenth groups are electrically connected to the common ground terminal of the second connector. Thus, by three connectors and only three wires, it is possible to have ten groups which can be dynamically addressed by the lighting driver.

Further, an embodiment relates to a lighting system comprising a lighting driver and a lighting device as previously described.

In particular, the lighting device comprises an error detection module, wherein the error detection module is configured to detect a malfunctional lighting element and/or a group comprising at least one malfunctional lighting element.

In particular, the error detection module is configured to detect a current through each of the groups of lighting elements (by the anode terminals of one of the connectors), wherein an error is identified upon detection of a current through one of the groups below or above a current threshold. In case of a defect in a LED of a lighting element, no current is flowing through the defective LED anymore which can be detected by the error detection module. Of course, instead of current, the voltage of each group of lighting elements may be detected by the error detection module, wherein an error is detected upon a detection of a voltage through one of the groups above or below a voltage threshold. In case of a defect in an LED, no current is flowing though the LED anymore and voltage will increase substantially which can be detected by the error detection module as an error. In case of an LED short defect the voltage drop can be measured.

In particular, the error detection module is configured to detect a current though each of the groups of lighting elements individually, wherein an error is detected upon detection of a deviation of the current through a first group from the current through a second group. Therefore, the first group and the second group can include the same number of lighting elements. An error can be detected if the deviation is exceeds a preset limit.

BRIEF DESCRIPTION OF THE DRAWINGS

None limiting and none exhaustive embodiments of the present disclosure as described is referenced to the following figures, wherein same or similar elements are indicated by identical reference signs.

DETAILED DESCRIPTION OF THE EMBODIMENTS

In the following description, for purposes of explanation rather than limitation, specific details are set forth such as the particular architecture, interfaces, techniques, etc., in order to provide a thorough understanding of the concepts of embodiments. However, it will be apparent to those skilled in the art that the present embodiments may be practiced in other embodiments, which depart from these specific details. In like manner, the text of this description is directed to the example embodiments as illustrated in the Figures and is not intended to limit the claimed embodiments beyond the limits expressly included in the claims. For purposes of simplicity and clarity, detailed descriptions of well-known devices, circuits, and methods are omitted so as not to obscure the description of the present embodiments with unnecessary detail.

Figure 1:
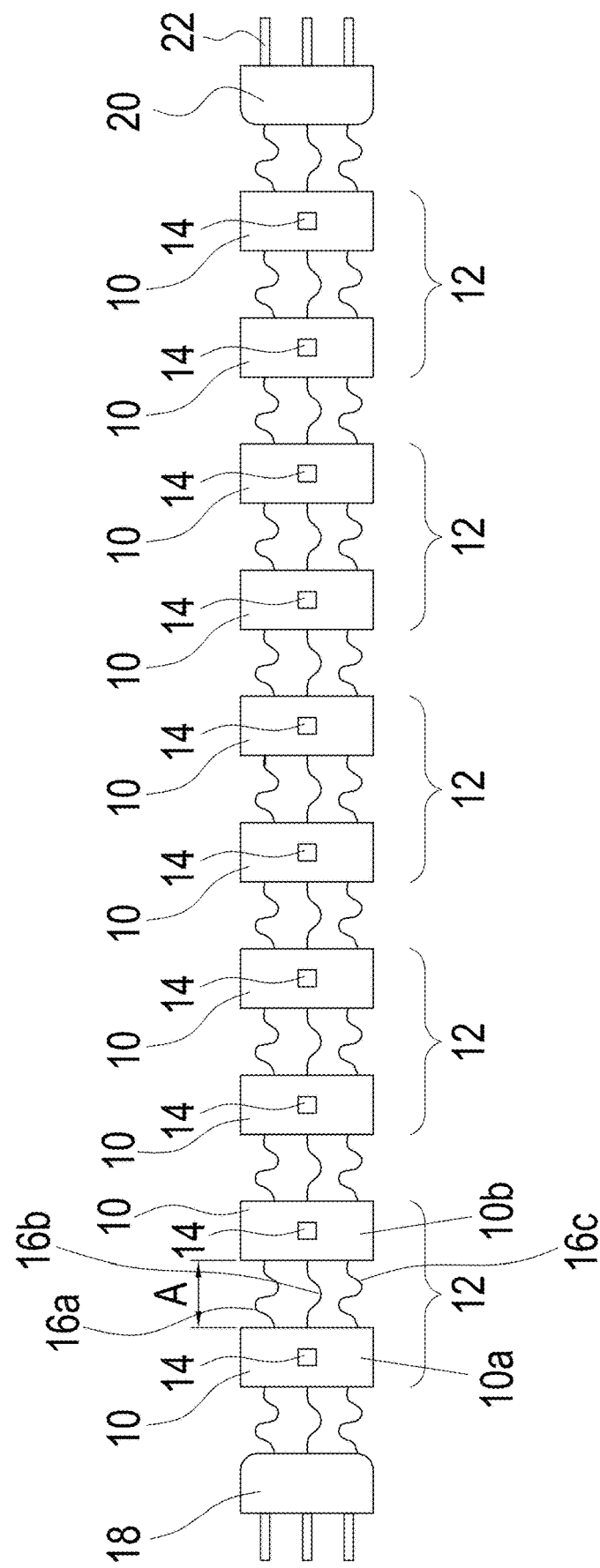
FIG. 1 a schematic drawing of a lighting device in accordance with embodiments.

FIG. 1 illustrates a realization of the lighting device in accordance with embodiments. The lighting device comprises a plurality of lighting elements 10, wherein in the example of FIG. 1, the lighting device comprises ten lighting elements 10. Therein, the lighting elements 10 are divided into five groups 12, wherein each group consists of two lighting elements 10. Of course, the lighting device may have less than 10 lighting elements 10 or more than 10 lighting elements 10. Additionally, also each group may consist of one or more lighting elements 10. Each of the lighting element comprises in the example of FIG. 1 one light emitting diode (LED) 14. Each lighting element 10 may also comprise more than one LED 14. In particular, it is not necessary that each of the lighting elements 10 have the same number of LEDs 14. Each of the lighting elements 10 can have the same number of LEDs 14 and each of the groups 12 can comprise the same number of lighting elements 10 as depicted in FIG. 1. Thus, each group can have the same number of LEDs.

All LEDs 14 are directed in the same direction. Thus, along the complete lighting device light is emitted only in one half space. Therein, the lighting device may emit light only with an opening angle of the emission equal to or below 180° or equal to or below 120° or equal to or below 90°. In order to enhance the characteristics of emission further, a reflective element can be arranged on a plane parallel to the common plane of LEDs (corresponding to the image plane of FIG. 1), reflecting all light into the desired half space. Further, the width of the lighting device is below 10 mm or below 6 mm. Thus, a very narrow and long luminous band can be built providing a high efficiency of lighting.

The lighting elements 10 are arranged in a row, wherein each lighting element 10 is directly connected to a preceding lighting element and/or a following lighting element 10 by wires 16a-16c. Thus, the lighting device of FIG. 1 comprises three wires between each of the lighting elements. In the example of FIG. 1 the number of wires 16 between each of the lighting elements 10 is identical. However, it is also possible to have between at least two or more lighting elements 10 an unequal number of wires. The lighting elements 10 are electric connected to each other by the wires and the same electric wires also provide the physical connection of the lighting elements. However, the physical connection need not to be the same as the electrical connection. In the embodiment of FIG. 1, a first lighting element 10a is directly electrical and physically connected to a second lighting element 10b by wires 16a to 16c.

At the beginning of the row of lighting elements 10, a first connector 18 is connected via wires 16a to 16c to the row of lighting elements 10. Additionally, a second connector 20 is connected at the end of the row of lighting elements 10 also by the wires 16a-16c. The first connector and the second connector each comprise three terminal pins 22, wherein the number of terminal pins of the connectors 18, 20 is equal to the number of wires of the lighting device. Thus, by using two connectors 18, 20 and three wires 16a to 16c, five groups 12 can be individually controlled by a lighting driver (not shown) to which the lighting device of FIG. 1 is connected via the first connector 18 and the second connector 20. Thus, a sufficient number of groups can be dynamically controlled while the complexity of wiring each of the individual group is low using only three wires between each of the lighting elements 10.

As shown in FIG. 1, the distance A between each of the lighting elements 10 is smaller than the length of each wire 16a-16c. In the example of FIG. 1 the distance A between each of the lighting elements 10 is equal. However, it is also possible to have at least two or more distances between respective lighting elements 10 which differ from each other. The wires have a bended or tortuous shape in order to provide an excess length. By this excess length, bending of the lighting device is possible and further thermal expansions of the lighting device can be compensated. Additionally, the outer wires 16a, 16c, comprise a longer length than the inner or central wire 16b. Thus, the lighting device can be bended in a plane in which also the wires 16a to 16c are arranged corresponding to the plane of the image plane of FIG. 1. Therefore, the lighting device can be adapted to any 3D shape of the application. In particular, due to the specific configuration twisting of the lighting device of 90° is possible within a short length, providing sufficient flexibility to be adapted to all different kinds of applications, i.e.

shapes. Further, a bending radius can be below 100 mm, below 50 mm, or below 25 mm.

Figure 2:
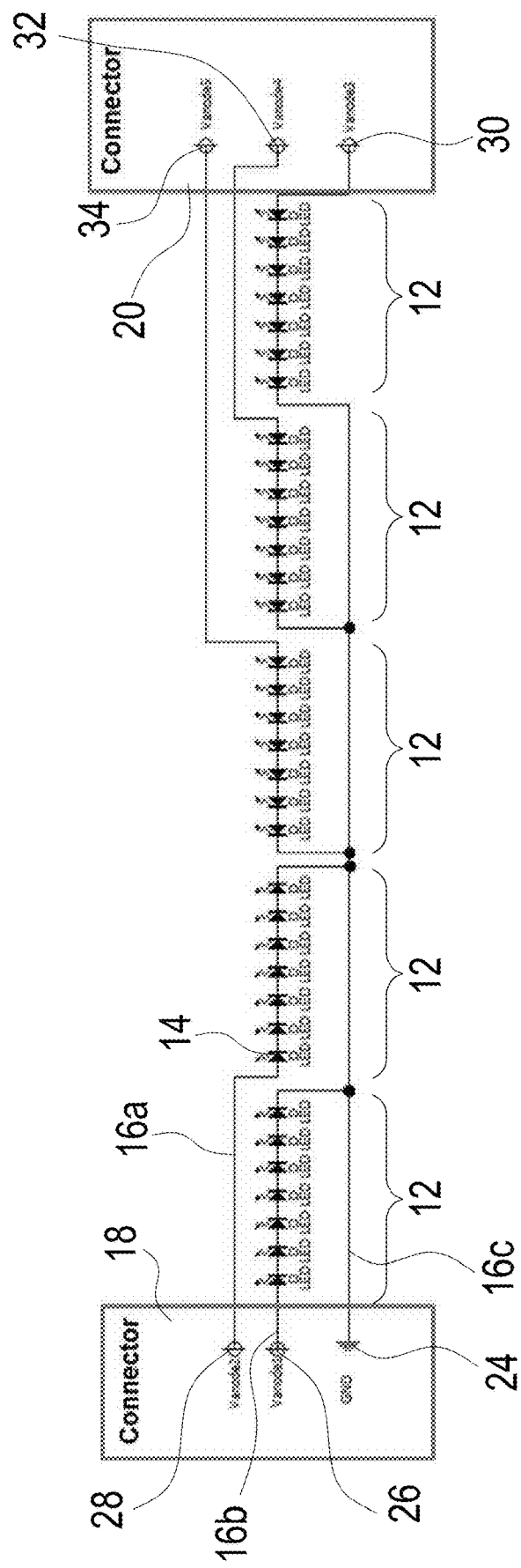
FIG. 2 a circuit diagram for an embodiment.

FIG. 2 shows a circuit diagram of a lighting device comprising five groups 12 in accordance to FIG. 1, wherein each group 12 comprises in the example of FIG. 2 seven LEDs 14. Therein, each LED 14 can be disposed on an individual lighting element 10 or more than one LED 14 can be disposed on a single lighting element 10 of one group 12 up to the case that all seven LEDs 14 are disposed on a single lighting element 10. Further, the lighting device of FIG. 2 has a first connector 18 and a second connector 20. Three parallel wires 16a, 16b and 16c are staring from the first connector 18 and are arranged in parallel along the entire length of the lighting device connecting also the second connector 20. The LEDs 14 are arranged along a row in order to define a luminous band or lighting ribbon.

The first connector 18 comprises a ground terminal 24, as well as a first anode terminal 26 and a second anode terminal 28. The second connector 20 comprises a third anode terminal 30, a fourth anode terminal 32 and a fifth anode terminal 34. Therein, with the first anode terminal 26, a first group of LEDs is controlled. With the first anode terminal 26, a first group 12 of LEDs 14 is controlled, wherein the first group 12 of LEDs 14 is connected to the ground terminal 24 of the first connector 18. With each further anode terminal of the first connector 18 or second connector 20, the groups 12 of LEDs 14 can be directly addressed by the lighting driver connected via the first connector 18 and the second connector 20 to the lighting device. Thus, by the anode terminal of the first connector 18 and the second connector 20, the five groups 12 of LEDs 14 can be individually addressed in order to provide dynamical lighting. This is achieved only by using three parallel wires along the entire length of the lighting device, thereby maintaining the ability to be bended the lighting device in all direction and providing a low complexity of wire routing within the lighting device.

Figure 3:
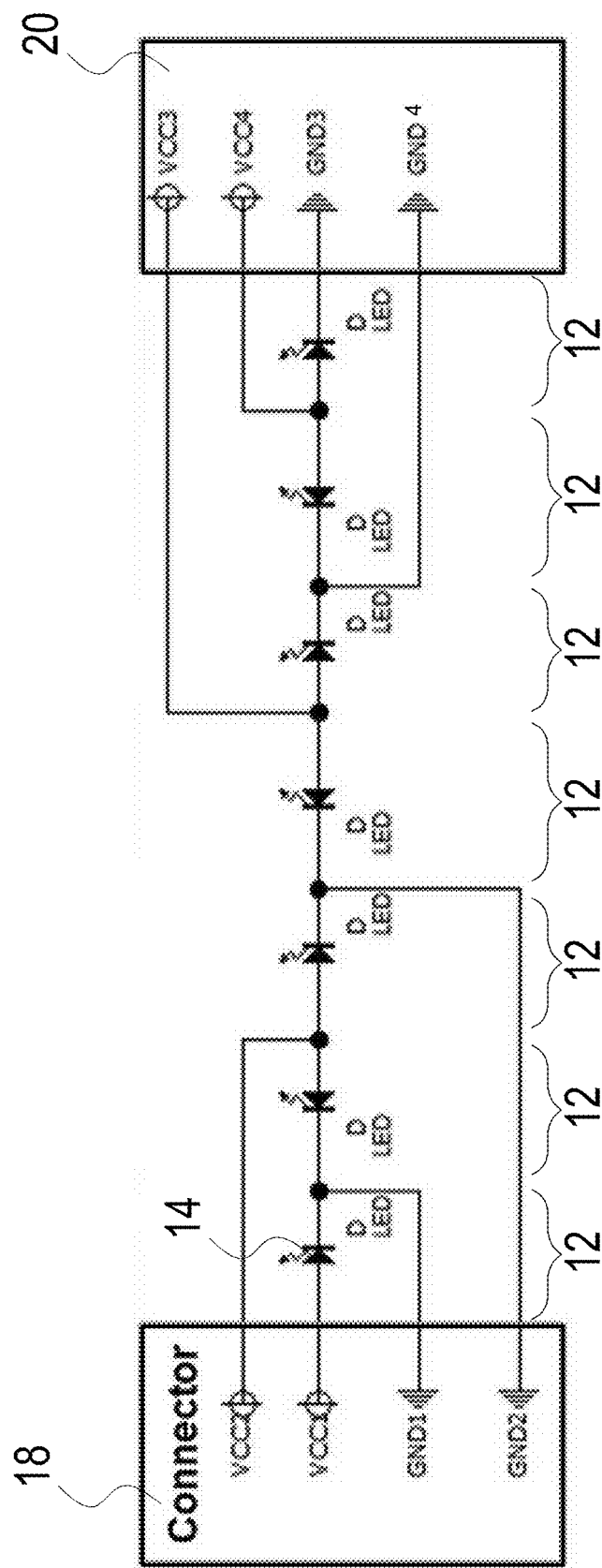
FIG. 3 a circuit diagram of another embodiment.

FIG. 3 shows another example of a circuit diagram of embodiments. Each group 12 consists of only a single LED 14, wherein seven groups 12 are present in FIG. 3. However, each group 12 may also comprise more than one LED 14. Further, it is possible to provide a smaller number of groups 12.

The first connector 18 comprises a first ground terminal, as well as a second ground terminal and a first anode terminal, as well as a second anode terminal. The second connector 20 comprises a third ground terminal and a fourth ground terminal, as well a third anode terminal, as well as a fourth anode terminal. Thus, the first connector 18 and the second connector 20 are connected to the lighting elements 10 of the lighting device by four wires which are arranged in parallel along the entire length of the lighting device. Thus, by the terminals of the first connector 18 and the second connector 20 connecting the lighting device to a lighting driver, each group 12 can be controlled individually in order to provide dynamical lighting.

Figure 4:
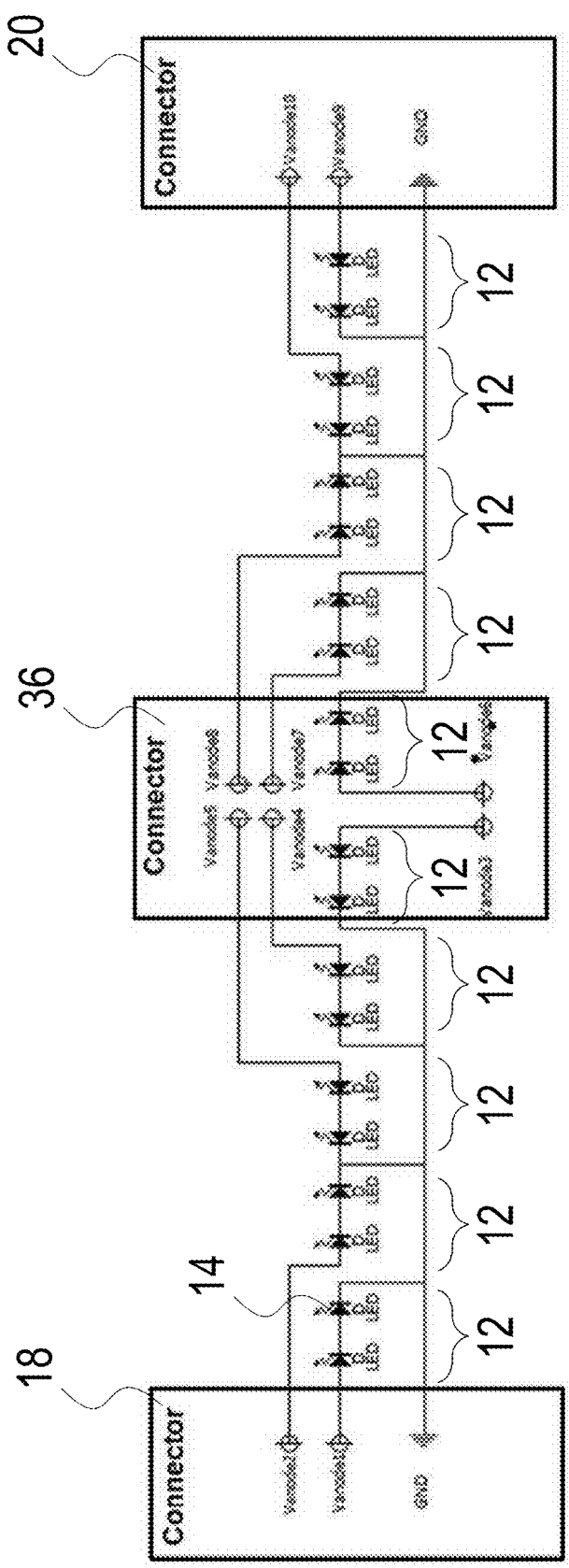
FIG. 4 a circuit diagram of another embodiment.

FIG. 4 shows another embodiment, wherein each group 12 is exemplified to have two LEDs 14 which can disposed on different lighting elements 10 or the same lighting element 10. However, further LEDs 14 and/or further lighting elements 10 can be introduced in each group 12.

The lighting device of FIG. 4 shows a first connector which is identical to the connector of FIG. 2. Further, the lighting device comprises a second connector 20 which is identical to the second connector 20 of FIG. 2. Thus, also in the embodiment of FIG. 4, three parallel wires are foreseen along the lighting device. However, additionally a third connector 36 is disposed between the first connector 18 and the second connector 20. In particular, the third connector 36 is disposed between the fifth and sixth group 12 of the lighting device. The third connector 36 has six anode terminals to be connected to the lighting driver to control individually the groups 12 of LEDs 14 in order to achieve dynamical lighting.

Figure 5:
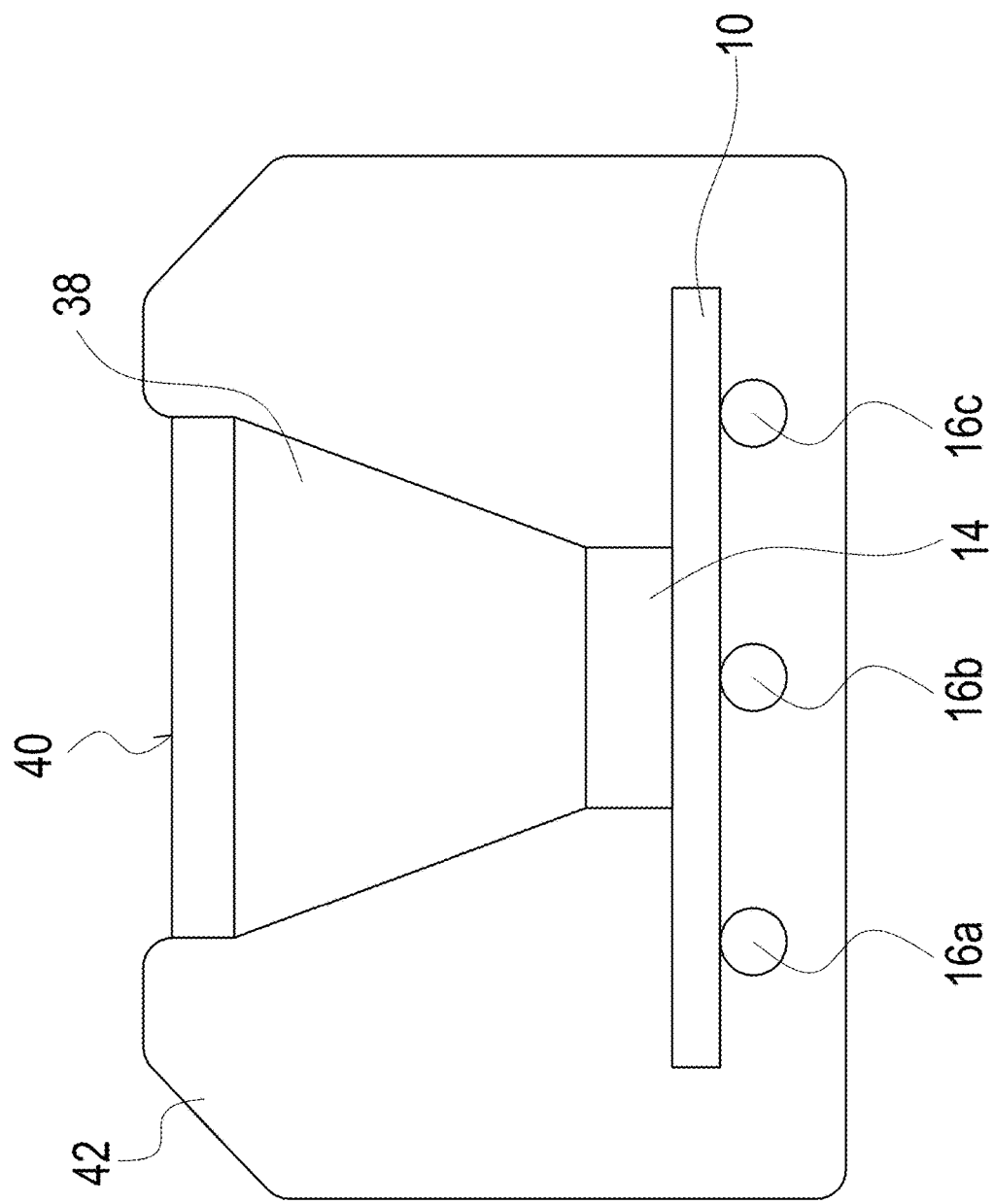
FIG. 5 a cross-section of the lighting device.

FIG. 5 shows a cross-section of the lighting device. An LED 14 is disposed on top of an interposer or lighting element 10. The lighting element 10 is connected by three wires 16a, 16b, 16c in the example of FIG. 5. The light emitting side of the LED 14 is connected by a transparent polymer 38 to a light emitting surface 40 of the lighting device. The wires 16a, 16b, 16c, the lighting element 10, the LED 14 and the transparent polymer 38 is surrounded by an opaque polymer 42. The opaque polymer 42 serves as protection cover for the lighting device while still providing sufficient flexibility. Additionally, the opaque polymer 42 might be white polymer that is reflecting any light emerging from the transparent polymer 38 back towards the light emitting surface 40 thereby increasing the efficiency of the lighting device. Of course, the opaque polymer 42 can have alternatively any other color being adapted to the specific application.

Figure 6:
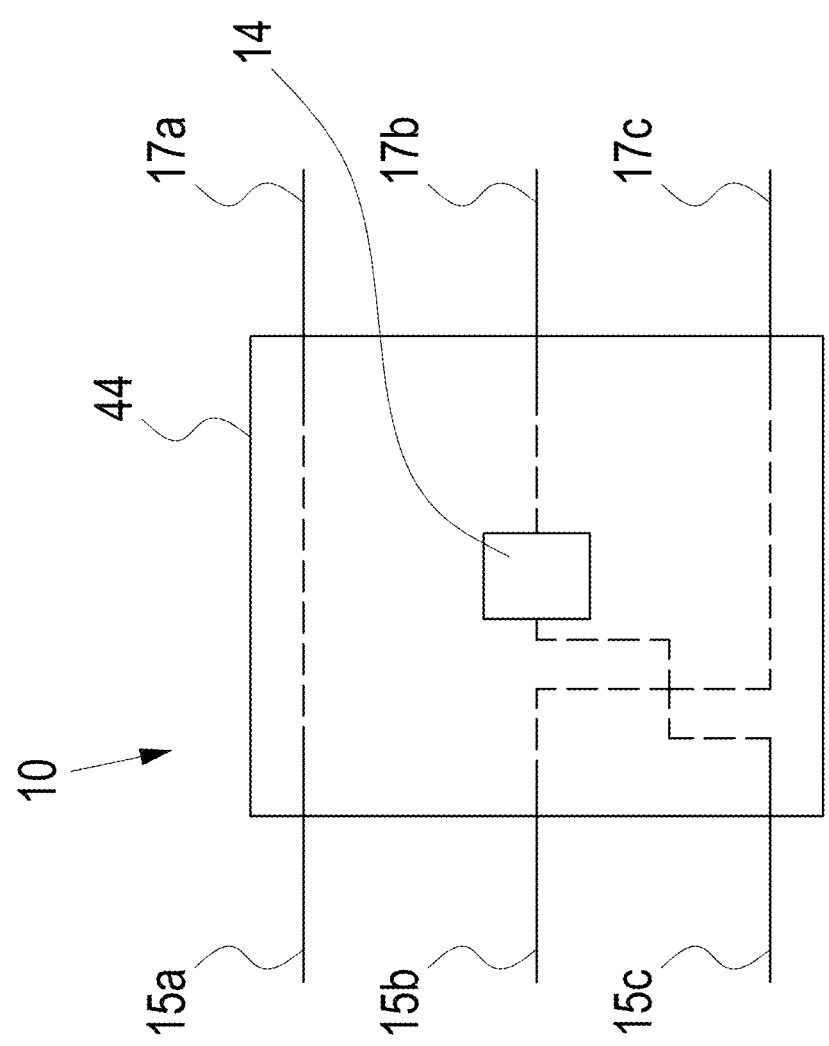
FIG. 6 a detailed view of a lighting element.

FIG. 6 shows a detailed view of an interposer or lighting element 10. The lighting element 10 comprises a printed circuit board (PCB) 44 with an LED 14 arranged on one upper side of the PCB 44. The PCB 44 is connected to a preceding lighting element 10 or connector in the row by a first set of three wires 15a, 15b, 15c, wherein the three wires are placed in parallel and connected to the PCB 44 at a first position (upper position in FIG. 6), a second position (middle position in FIG. 6) and third position (lower position in FIG. 6), respectively. However, in other embodiments more or less wires can be implemented. In addition, the lighting element 10 is connected to a following lighting element 10 or connector by a second set of three wires 17a, 17b, 17c which are placed also in parallel and connected to the PCB 44 on the opposite side to the first set, wherein the wires are also connected to the PCB 44 at positions corresponding to the first position, second position, and third position. Therein, dashed lines in FIG. 6 indicate electrical routing provided by the PCB 44 of the lighting element 10. In the example of FIG. 6 a first anode connection 15a, 17a is running through the PCB 44, wherein the first anode connection 15a, 17a is on both sides of the PCB 44 connected at the first position to the PCB 44. However, a second anode connection 15b, 17c might be connected at different positions at the two sides of the PCB 44. Further, a ground connection 15c might be connected at one position to the PCB on a first side and then connected by the circuitry of the PCB 44 to the LED. An anode connection 17b might be connected to the PCB 44 at the same side or the opposite side at the same or different position to the ground connection 15c and then connected to the LED 14. Thus, the LED 14 is connected to an anode connection 17b by the circuitry of the PCB 44 and also to the ground connection 15c in order to supply power to the LED 14. Thus, by the PCB 44 of the lighting elements 10 a more complex wire routing can be implemented such as crossing electrical lines to be able to maintain parallel wires between each of the lighting elements. Thereby, a high degree of freedom regarding the wire routing along the lighting device is provided.

The invention claimed is:

1. A lighting device for an automotive application, the lighting device comprising:
a plurality of lighting elements, each lighting element of the lighting elements comprising at least one or more light emitting diodes, the lighting elements arranged in a row to form a luminous band and divided into groups including a first group and a second group, each group of the groups including two or more lighting elements of the lighting elements electrically connected in series on separate, directly adjacent boards, a first lighting element of a group directly electrically connected by more than one electrical wire to a second lighting element of the group, the lighting elements of each of the groups electrically connected in series by a ground wire; and
a first connector for connecting the lighting device to a single lighting driver by first, second, and third pins, the first pin electrically connected to only the first group by a first wire, the second pin electrically connected to only the second group by a second wire, and the third pin electrically connected to both the first and second groups by the ground wire.

2. A lighting device according to claim 1, wherein a number of wires directly connecting a board of the boards to a directly adjacent board of the boards is between two and four and the first connector is configured to connect each of the wires to the lighting driver.

3. A lighting device according to claim 2, wherein the lighting device is flexible in two directions and/or twistable along a longitudinal axis.

4. A lighting device according to claim 1,
wherein a light emitting area of the lighting device has a width of less than 10 mm, and/or
wherein the width of the lighting device is less than 10 mm, and/or
wherein the height of the lighting device is less than 10 mm.

5. A lighting device according to claim 1,
wherein the lighting elements and the wires are at least partially surrounded by a polymer, and
wherein the polymer comprises a first part, which first part is transparent and is arranged in front of the lighting elements in the direction of light emission, and a second part which is opaque.

6. A lighting device according to claim 1, wherein the wires coupled between two lighting elements are individual wires separated from each other and are arranged in parallel.

7. A lighting device according to claim 6, wherein the length of the wires between two directly adjacent boards is greater than the distance between two directly adjacent lighting elements, and
wherein wires closer to respective edges of directly adjacent boards is longer than a wire further from the respective edges.

8. A lighting device according to claim 1, wherein at least two groups consist of the same number of lighting elements.

9. A lighting device according to claim 1:
wherein the lighting elements are divided into more groups including a third group and a fourth group;
further comprising a second connector for connecting the lighting device to the single lighting driver by fourth and fifth pins, the fourth pin electrically connected to only the third group by a fourth wire, the fifth pin electrically connected to only the fourth group by a fifth wire
wherein the first connector is arranged at the beginning of the row and the second connector is arranged at the end of the row.

10. A lighting device according to claim 9,
wherein a third connector is arranged between the first connector and the second connector along the row for connecting at least a fifth group of lighting elements to the lighting driver.

11. A lighting device according to claim 1,
wherein the lighting device emits light in one direction only, and
wherein an opening angle of the emitted light is below or equal to 180°.

12. A lighting device according to claim 1, wherein each board comprises a printed circuit board.

13. A lighting system comprising:
a lighting device comprising:
a plurality of lighting elements, each lighting element of the lighting elements comprising at least one or more light emitting diodes, the lighting elements arranged in a row to form a luminous band and divided into groups including a first group and a second group, each group of the groups including two or more lighting elements of the lighting elements electrically connected in series on separate, directly adjacent boards, a first lighting element of a group directly electrically connected by more than one electrical wire to another lighting element of the group, the lighting elements of each group of the groups electrically connected in series by a ground wire; and
a first connector for connecting the lighting device to a single lighting driver by first, second, and third pins, the first pin electrically connected to only the first group by a first wire, the second pin electrically connected to only the second group by a second wire, and the third pin electrically connected to both the first and second groups by the ground wire; and
the lighting driver coupled to drive the lighting device.

14. A lighting system according to claim 13, comprising an error detection module, wherein the error detection module is configured to detect an error in a lighting element of the lighting elements and/or in a group of lighting elements.

15. A lighting system according to claim 14,
wherein the error detection module is configured to detect a current and/or voltage through each of the groups of lighting elements individually, and
wherein an error is identified upon detection of a current and/or voltage through one of the groups below or above a current threshold and/or voltage threshold.

16. A lighting system according to claim 14,
wherein the error detection module is configured to detect a current and/or voltage through each of the groups of lighting elements individually, and
wherein an error is detected by a deviation from the current and/or voltage through a first group with respect to the current and/or voltage through a second group, wherein the error is determined when the deviation exceeds a preset limit.

17. A method of configuring a first lighting device on an automotive, the method comprising:
situating the first lighting device below or between second lighting devices of the automotive, the first lighting device including a plurality of lighting elements, each lighting element of the lighting elements comprising one or more light emitting diodes, the lighting elements arranged in a row to form a luminous band and divided into groups including a first group and a second group, each group of the groups including two or more lighting elements of the lighting elements electrically connected in series on separate, directly adjacent boards, a first lighting element of a group directly electrically connected by more than one electrical wire to another lighting element of the group, the lighting elements of each group of the groups electrically connected in series to a ground wire; and connecting the lighting device, via a first connector, to a single lighting driver by first, second, and third pins, the first pin electrically connected to only the first group by a first wire, the second pin electrically connected to only the second group by a second wire, and the third pin electrically connected to both the first and second groups by the ground wire.

18. The method of claim 17, further comprising mechanically coupling directly adjacent boards by more than two electrical wires.

* * * * *